United States Patent
Langham et al.

(10) Patent No.: US 8,448,235 B2
(45) Date of Patent: May 21, 2013

(54) METHOD FOR KEY IDENTIFICATION USING AN INTERNET SECURITY ASSOCIATION AND KEY MANAGEMENT BASED PROTOCOL

(75) Inventors: Timothy M. Langham, Streamwood, IL (US); Thomas J. Senese, Schaumburg, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1289 days.

(21) Appl. No.: 13/173,020

(22) Filed: Jun. 30, 2011

(65) Prior Publication Data

US 2012/0036363 A1 Feb. 9, 2012

Related U.S. Application Data

(60) Provisional application No. 61/370,943, filed on Aug. 5, 2010.

(51) Int. Cl.
*G06F 9/00* (2006.01)

(52) U.S. Cl.
USPC ............... 726/14; 713/171; 713/168

(58) Field of Classification Search
USPC ............... 713/168, 171; 726/14, 15
See application file for complete search history.

(56) References Cited

U.S. PATENT DOCUMENTS

| | | | |
|---|---|---|---|
| 6,880,088 B1 | 4/2005 | Gazier et al. | |
| 7,028,183 B2 | 4/2006 | Simon et al. | |
| 7,036,010 B2 | 4/2006 | Wray | |
| 7,069,438 B2 | 6/2006 | Balabine et al. | |
| 7,158,803 B1 | 1/2007 | Elliott | |
| 7,181,196 B2 | 2/2007 | Patel | |
| 7,188,180 B2 | 3/2007 | Larson et al. | |
| 7,234,063 B1 * | 6/2007 | Baugher et al. | 713/189 |
| 7,373,660 B1 | 5/2008 | Guichard | |
| 7,389,412 B2 * | 6/2008 | Sharma et al. | 713/153 |
| 7,853,983 B2 | 12/2010 | Abrutyn et al. | |
| 7,895,648 B1 * | 2/2011 | Nandy et al. | 726/14 |
| 8,027,637 B1 | 9/2011 | Bims | |
| 2002/0013848 A1 | 1/2002 | Salle et al. | |
| 2003/0031151 A1 * | 2/2003 | Sharma et al. | 370/338 |
| 2004/0105542 A1 | 6/2004 | Takase et al. | |
| 2005/0135359 A1 | 6/2005 | Chang | |

(Continued)

FOREIGN PATENT DOCUMENTS

| | | |
|---|---|---|
| EP | 1632862 A1 | 3/2006 |
| WO | 2007149892 A2 | 12/2007 |

OTHER PUBLICATIONS

PCT International Search Report Dated May 22, 2012 for Counterpart Application PCT/US2011/045136.

(Continued)

*Primary Examiner* — Samson Lemma
(74) *Attorney, Agent, or Firm* — Valerie M. Davis; Kenneth A. Haas

(57) ABSTRACT

An initiating device: generates a message having an ISAKMP-based header that includes a security parameter index (SPI) field; identifies a key in the SPI field of the ISKMP-based header; and sends the message to a responding device. The responding device: receives the message; extracts the key identifier; and when a shared key is selected using the key identifier, uses the selected shared key to establish, with the initiating device, a session having a secure tunnel.

13 Claims, 3 Drawing Sheets

U.S. PATENT DOCUMENTS

| | | | |
|---|---|---|---|
| 2006/0168210 A1* | 7/2006 | Ahonen et al. | 709/225 |
| 2008/0019525 A1 | 1/2008 | Kruegel | |
| 2008/0076412 A1 | 3/2008 | Khetawat et al. | |
| 2008/0126559 A1 | 5/2008 | Elzur et al. | |
| 2011/0099623 A1 | 4/2011 | Garrard et al. | |

OTHER PUBLICATIONS

C. Kaufman, et al. "Internet Key Exchange (IKEv2) Protocol; rfc4306.txt", XP015043225, ISSN:0000-0003; December 1, 2005.

PCT Search Report Dated Feb. 21, 2012 for Related Application PCT/US2011/045196.

A. Menezes, et al. "Handbook of Applied Cryptography", CRC Press, 1996; Chapter 10.

Sheila Frankel, et al. Guide to IPsec VPNs:Recommendations of the National Institute of Standards and Technology; NIST Special Publication 800-77; Dec. 2005.

PCT International Preliminary Report on Patentability Dated Nov. 1, 2011 for Related U.S. Appl. No. 12/731,220 (PCT/US2010/031663).

D. Harkins, et al. Network Working Group, RFC 2409; "The Internet Key Exchange", 42 Pages; Nov. 1998.

CISCO IOS Software's Lock and Key Commands; 8 Pages; 1992.

RFC 4301, Kent, et al. "Security Architecture for the Internet Protocol", BBN Technologies, Dec. 2005.

Larry Murrill, "Data Association Application", Apr. 3, 2009.

Larry Murrill, "Proposals for Mechanisms for Recommendation 11 Edition 2", Mar. 13, 2009.

C. Kaufman, et al. "Internet Key Exchange (KEV2) Protocol; RFC 4306 TXT", IETF Standard, Internet Engineering Task Force, IETF, CH; Dec. 1, 2005; XP015043225; ISSN-0000-0003.

PCT International Search Report Dated Jan. 25, 2011 for Related U.S. Appl. No. 12/731,220.

PCT International Preliminary Report on Patentability Dated Nov. 1, 2011 for Related U.S. Appl. No. 12/731,220.

TETRA Association SFPG Recommendation 11; End to End Encryption of Packet Data; November 15, 2007; pp. 26 (Section 7.2.1), 27 (Section 7.3) and 31 (Section 8.1).

Kent, S. et al., "IP Encapsulating Security Payload (ESP)," RFC 4303, Dec. 2005, pp. 45.

Timothy Langham; Project 25, Packet Data Security Service, Version 1, Apr. 28, 2009.

International Preliminary Report on Patentability and Written Opinion mailed on Feb. 5, 2013 in counterpart International Patent Application No. PCT/US2011/045136.

International Preliminary Report on Patentability and Written Opinion mailed on Feb. 21, 2012 in counterpart International Patent Application No. PCT/US2011/045196.

Non Final Office Action mailed Dec. 6, 2012 in related U.S. Appl. No. 13/174,324, Thomas J. Senese, filed Jun. 30, 2011.

\* cited by examiner

US 8,448,235 B2

METHOD FOR KEY IDENTIFICATION USING AN INTERNET SECURITY ASSOCIATION AND KEY MANAGEMENT BASED PROTOCOL

REFERENCE TO RELATED APPLICATIONS

The present application is related to the following U.S. applications commonly owned together with this application by Motorola, Inc.:

Ser. No. 12/731,220, filed Mar. 25, 2010, titled "Method and Apparatus for Secure Packet Transmission" by Larry Murrill, which claims the benefit of provisional application Ser. No. 61/173,182 filed Apr. 27, 2009;

Ser. No. 61/371,735 filed Aug. 8, 2010 titled "Methods for Establishing a Security Session in a Communication System" by Senese, et al.; and Ser. No. 61/370,943 filed Aug. 5, 2010 titled "Method for Key Identification Using an Internet Security Association and Key Management Based Protocol" by Langham, et al., which is a provisional filing from which the present application claims the benefit of its priority date.

TECHNICAL FIELD

The technical field relates generally to secure session establishment or, more particularly, to secure exchange of key material using Internet Security Association and Key Management Protocol (ISAKMP) based protocols.

BACKGROUND

In many instances today, two devices connected by a data network such as the Internet or other Internet Protocol (IP) based network must perform secure data exchanges in order to synchronize sensitive information, such as key material, required for the two devices to perform subsequent communications. This can be done using an appropriate key exchange protocol, such as an Internet Security Association and Key Management Protocol (ISAKMP)-based protocol. ISAKMP is a protocol defined by Request for Comments (RFC) 2408 for establishing Security Associations (SA) and cryptographic keys in an Internet environment and which provides a framework for authentication and key exchange. Accordingly, an Internet Security Association and Key Management Protocol based protocol (also referred to herein as an ISAKMP-based protocol) is defined as a key exchange or key management protocol that uses ISAKMP as a framework to perform a key exchange procedure to securely negotiate an encryption key to be used for further communication.

One example ISAKMP-based protocol is Internet Key Exchange (IKE) protocol that can be used to perform a key exchange procedure to securely negotiate an encryption key to be used for further communication via Internet Protocol Security (IPSec) protocol (which is defined in a series of RFCs), wherein however, IPSec is not considered to be an ISAKMP-based protocol. IKE has two versions, IKEv1 and IKEv2, defined in RFCs 2409 and 4306, respectively. Other ISAKMP-based protocols include, for example, Kerberized Internet Negotiation of Keys and any other such protocol now existing or developed in the future.

Although IKE and ISAKMP are often used to negotiate encryption and authentication keys for IPSec or other data security protocols, these protocols themselves rely on out of band provisioning of some sort of key. Often, this key is a pre-shared key (also referred to herein as a "shared key") provisioned identically into both devices involved in the negotiation. A pre-shared key is often preferred for its simplicity and can be used, for instance, to establish a security session and, thereby, a secure tunnel for communicating data.

However, the IKE protocol suffers from a limitation that there is no way to signal the identity of the pre-shared key other than implicitly through lower layer address information. This makes changing the pre-shared key a difficult process since any devices using the same key must have their pre-shared key changed simultaneously to avoid a potential loss of ability to securely communicate. Solutions to this problem typically involve the use of public-key certificates. However, this solution is often not desirable because it requires a public key infrastructure (PKI) that requires a significant effort on the part of network administrators to maintain.

Thus, there exists a need for methods for signaling key material such as the identity of a pre-shared key used for securing data exchanges based on ISAKMP-based protocols.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
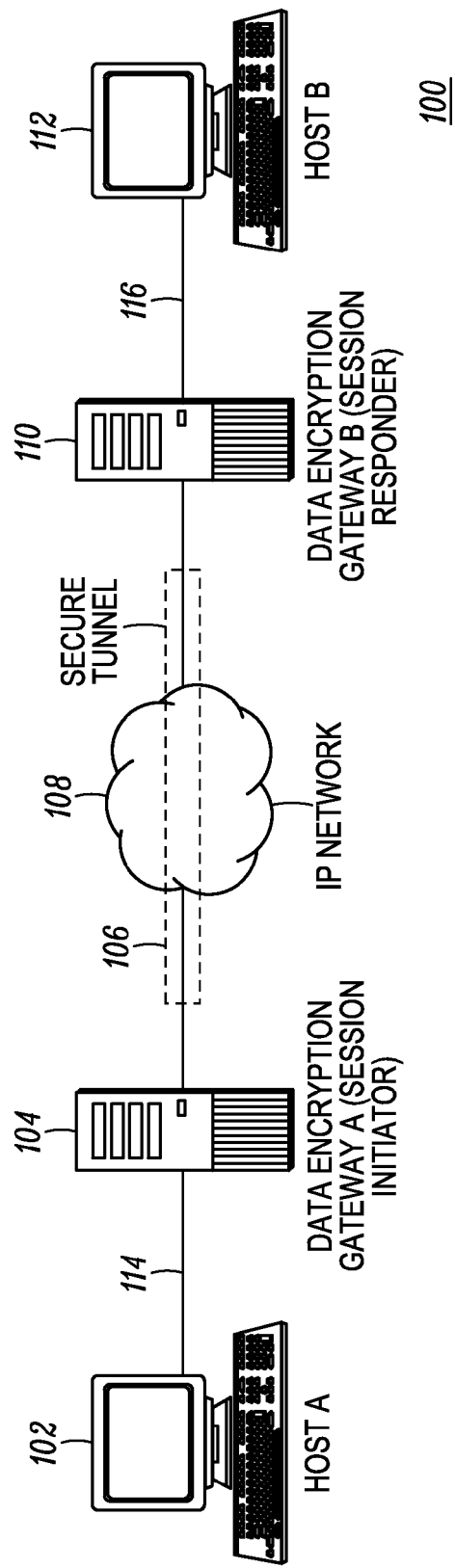
FIG. 1 is a diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, an initiating device: generates a message using an ISAKMP-based protocol that has an ISAKMP-based header, which includes a security parameter index (SPI) field; identifies a key in the SPI field of the ISKMP header; and sends the message to a responding device. The responding device: receives the message; extracts the key identifier; and when a pre-shared key is selected using the key identifier, uses the selected shared key to establish, with the initiating device, a security session having a secure tunnel The key and its associated identifier are provisioned into each device prior to the exchange.

This novel key identification technique (which is an enhancement to the existing IKE protocol, for example) allows pre-shared keys to be changed regularly without even temporary loss of secure communication ability when managed using a simple key changeover process. In an embodiment, pre-shared keys may be updated using an ISAKMP-based key management protocol other than IKE, which is tailored for the needs of pre-shared key updates. Those skilled in the art will realize that the above recognized advantages and other advantages described herein are merely illustrative and are not meant to be a complete rendering of all of the advantages of the various embodiments.

Referring now to the drawings, and in particular FIG. 1, a diagram of a communication system in accordance with some embodiments is shown and indicated generally at 100. System 100 includes Host A (102) and Host B (112) (e.g., IP network hosts that implement an IP protocol), and data encryption gateways (DEGs) A (104) and B (110) that communicate using a network 108, which in this case is an IP network, wherein IPv4 or IPv6 is implemented to enable endpoints to be reachable anywhere within system 100 using IP addresses. Accordingly, security processing is implemented in system 100 using IPsec. However, network 108 can be any type of suitable network. Additionally, system 100 is shown as having two Host devices 102 and 112 and only two DEGs 104 and 110 for ease of illustration. However, in an actual system implementation, there may be hundreds and even thousands of Host devices that use system 100 to facilitate communications with other Host and infrastructure devices in system 100. Moreover, each DEG likely serves a number of Host devices, and there may be additional DEGs in an actual system implementation.

In this illustrative implementation, Hosts A and B each include applications that have a need to communicate in a secure manner, and DEGs 104 and 110 facilitate these secure communications via the network 108. For purposes of the teachings herein, we will assume that the Host A and the DEG 104 communicate with each other in a secure network; therefore, a link 114 between these devices is an unsecured link, meaning that no security protocol (such as IPSec) is implemented to send messages on this link. A message is defined as a unit of communication sent between the devices, such as a packet, wherein the size and format of the communication unit depends on the particular protocol used to create the communication unit. Likewise, Host B and the DEG 112 communicate with each other in a secure network; therefore, a link 116 between these devices is also an unsecured link.

However, when an application on Host A 102 needs to communicate with an application on Host B 112 and vice versa, the communication is sent first through the unsecure link 114 between Host A 102 and DEG A 104. A security protocol is used by the DEGs 104 and 110 in system 100 to provide security processing in order to generate secured packets that are sent between the devices. In other words, the packets travel within a secure "tunnel" 106 through the network 108, wherein the secure tunnel is created by virtue of the security processing via the application of the selected security protocols.

For example, the secure tunnel could be established using an ISAKMP-based protocol (such as IKE) and IPSec to establish a security session meaning a security protocol message exchange, whereby a security association (SA) is established. A SA, as the term is used herein, comprises elements that describe protocols and parameters (such as keys and algorithms) used by an endpoint (such as the DEGs 104 and 110) to secure information or traffic flowing in one direction. Therefore, in normal bi-directional traffic, the flows are secured by a pair of SAs forming the secure tunnel Stated in another way, The ISAKMP-based protocol message exchange is used to establish a security session between the DEGs for further communications. The DEG that initiates the security session, for instance by sending a Session Initiation Request, is called the initiating device. The DEG receiving the Session Initiation Request is the responding device.

Upon establishing the SAs (which provide for the secure tunnel) or in other words upon establishing the security session, the DEGs 104 and 110 can use a different security protocol like IPSec to encrypt IP packets sent between the devices. Alternatively the secure tunnel could be established by a different means, and the IKE or other ISAKMP-based message exchange between DEG A 104 and DEG B 110 could be to exchange other data, such as authenticated system time, in a secure manner without being associated with a particular IPSec encryption tunnel In this illustrative embodiment Hosts 102 and 112 can be peer devices or have a client/server relationship. Moreover, as illustrated in FIG. 1, each Host (which includes the application that generates the packets needing security processing) is shown as a separate physical entity from its respective DEG (which provides the security processing). However, in an alternative embodiment, the application and security processing are co-located or housed in the same physical host equipment. Thus, the Host and DEG, in that instance, are physically integrated, without loss of applicability of the teachings herein.

When the host equipment includes both the application and the security processing functionality, the security processing can be integrated into the single device using an integrated architecture implementation, wherein the security processing is natively in the layer-3 IP layer such as with IPv6; or using a bump in the stack (BITS) architecture that creates a protocol layer, e.g., an IPsec layer, that sits between the layer-3 IP layer and the layer-2 data link layer. The new layer intercepts packets sent down from the IP layer and adds security to them. When a gateway provides the security processing functionality, a bump in the wire (BITW) architecture is realized by a separate device that is placed within strategic points in the network to provide core security services to, for example, entire network segments.

In general, the Hosts A and B and the DEGs 104 and 110 are each implemented using (although not shown) a memory, one or more network interfaces, and a processing device that are operatively coupled, and which when programmed form the means for these system elements to implement their desired functionality, for example as illustrated by reference to the methods shown in FIG. 2 and FIG. 3. The network interfaces are used for passing signaling, also referred to herein as messaging, (e.g., messages, packets, datagrams, frames, superframes, and the like) between the elements of the system 100. The implementation of the network interface in any particular element depends on the particular type of network, i.e., wired and/or wireless, to which the element is connected.

For example, where the network supports wired communications, the interfaces may comprise a serial port interface (e.g., compliant to the RS-232 standard), a parallel port interface, an Ethernet interface, a USB interface, and/or a FireWire interface, and the like. Where the network supports wireless communications, the interfaces comprise elements including processing, modulating, and transceiver elements that are operable in accordance with any one or more standard or proprietary wireless interfaces, wherein some of the functionality of the processing, modulating, and transceiver elements may be performed by means of the processing device through programmed logic such as software applications or firmware stored on the memory device of the system element or through hardware.

The processing device utilized by these elements may be partially implemented in hardware and thereby programmed with software or firmware logic or code for performing functionality described by reference to FIG. 2 and FIG. 3; and/or the processing device may be completely implemented in hardware, for example, as a state machine or ASIC (application specific integrated circuit). The memory implemented by these system elements can include short-term and/or long-term storage of various information needed for the functioning of the respective elements. The memory may further store software or firmware for programming the processing device with the logic or code needed to perform its functionality.

Figure 2:
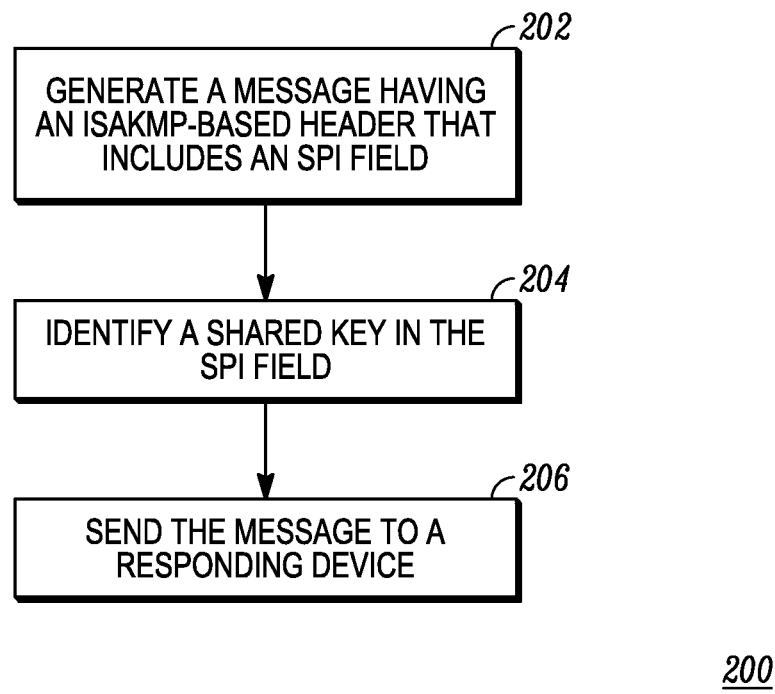
FIG. 2 is a flow diagram of a method, performed in an initiating device, for secure exchange of key material using an ISAKMP-based protocol, in accordance with some embodiments.

Turning now to FIG. 2, shown therein is a method 200 for identifying a key using an ISAKMP-based protocol, for example, IKEv1 or IKEv2 and any extensions, a APCO (Association of Public Safety Communications Officials International) Project 25 (P25) Packet Data Security Protocol (as currently being developed or as developed in the future), or any other ISAKMP-based protocol. Protocols based on ISAKMP, including IKE, include an 8 octet (byte) field at the beginning of each message (e.g., in a header referred to herein as an ISAKMP-based header like an IKEv1 header or and IKEv2 header or an APCO Project 25 Packet Data Security Protocol header). This eight byte field is generally referred to in this disclosure as a Security Parameter Index or SPI field). In the ISAKMP and IKEv1 RFCs, this 8 byte field is referred to as a "cookie". In IKEv2 this same field is referred to as a SPI. The ISAKMP and IKE RFCs do not require the SPI/cookie fields to have any other properties other than that they should be non-zero and unique for a given message exchange. However, in accordance with the teachings herein, a key such as a pre-shared key used to establish the secure tunnel or security session between two security processing endpoints (such as the DEGs 104 and 112) is identified in the SPI field of a message generated using an ISAKMP-based protocol.

Turning to method 200, at 202, the initiating device generates a message using an ISAKMP-based protocol, wherein the message includes the SPI field. For example, the initiating device generates a Session Initiation Message (as defined in the ISKMP-based protocol) that has an ISAKMP-based header, which includes the SPI field; identifies (204) a key in the SPI field such as a pre-shared or shared key needed to establish the secure tunnel/security session; and sends (206) the message to a responding device. Any suitable key identifier (ID) can be used to identify the key. However, in one illustrative implementation, the key identifier is at least a combination (e.g., a concatenation or any other suitable combination function) of a key ID and an algorithm ID included in the cookie field of an IKEv1 header, an example format of which is shown in Table 1 below. In another example implementation, the key identifier is at least a combination of a key ID, an algorithm ID, and a manufacturer ID included in the SPI field of an IKEv2, an example format of which is shown in Table 2 below.

TABLE 1

| 64 | 48 | 47 Bit number 40 | 40 | 0 |
|---|---|---|---|---|
| Key ID (16 bits) | | Algorithm ID (8 bits) | | SPI/Cookie Data |

TABLE 2

| 64 | 56 | 55 Bit number 48 | 47 | 32 | 31 | 0 |
|---|---|---|---|---|---|---|
| Manufacturer ID (8 bits) | | Algorithm ID (8 bits) | | Key ID (16 bits) | | SPI/Cookie Data |

ISAKMP and IKE allow for the use of a variety of encryption and authentication algorithms. Although these protocols also allow for the subsequent negotiation of encryption and authentication algorithms to use in later phases of the exchange, the algorithm ID in the encoding defined in Table 1 and Table 2 may be used in reference to a key management system that was responsible for provisioning the pre-shared key. In a system having multiple manufacturers that may define conflicting algorithm ID values, the manufacturer ID defined in Table 2 can be used to further refine the key identified by the rest of the field. The remaining bits of the SPI/cookie field are generated in a system specific manner, for instance by being pseudo-randomly generated.

Figure 3:
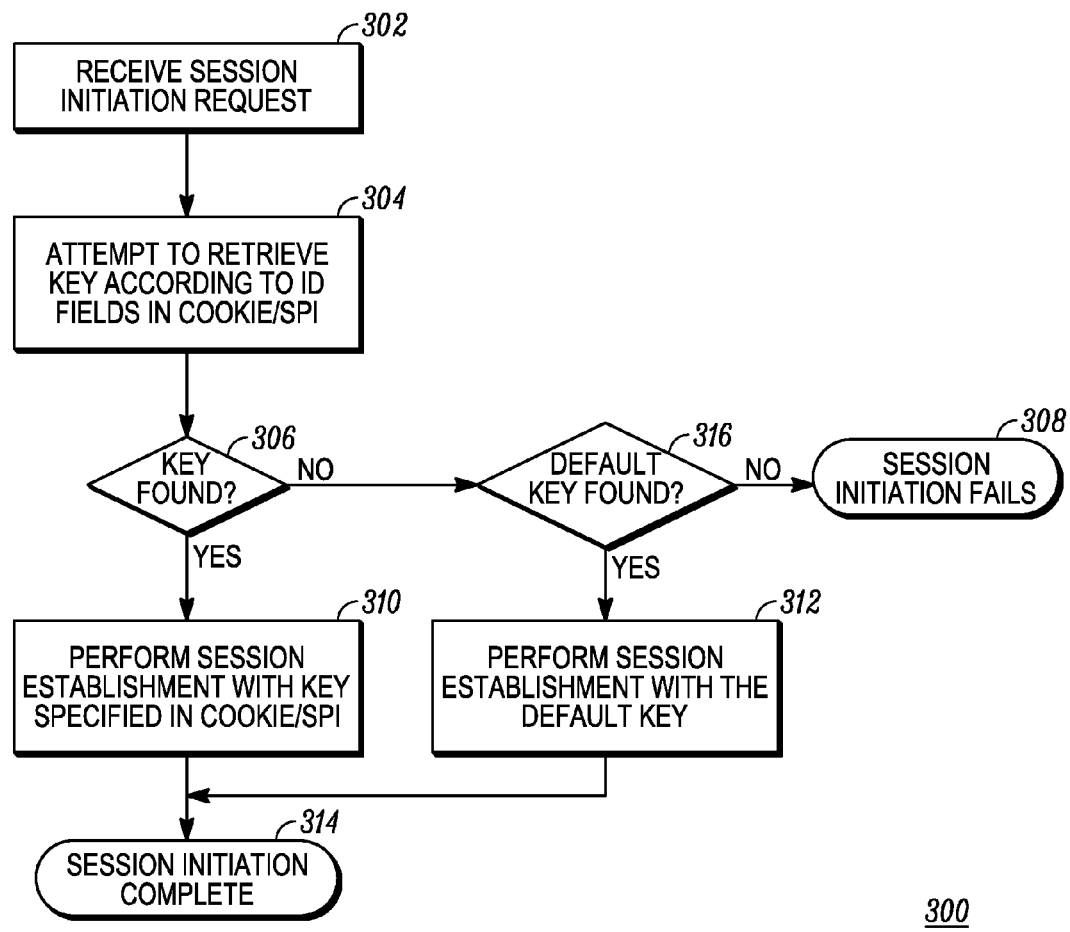
FIG. 3 is a flow diagram of a method, performed in a responding device, for exchange of key material using an ISAKMP-based protocol, in accordance with some embodiments.

FIG. 3 illustrates a method 300 implemented in a responding device in accordance with the teachings herein. At 302, the responding device receives a message (e.g., a Session Initiation Request) that includes a key identifier that identifies a key and extracts the key identifier. The responding device assumes that the SPI/cookie field in the Session Initiation Request is defined as in Table 1 or Table 2, or in a similar manner. Therefore, the responding device attempts to retrieve (304) a shared key identifier from its local key store with the encoded key, wherein the shared key is for establishing a security session between the initiating and responding devices using an ISAKMP-based protocol. When the message includes an ISAKMP-based header having the SPI/cookie field that includes the key identifier, and the shared key is identified and selected (306) using the key identifier, the responding device uses the selected shared key to establish the security session with the initiating device and, thereby, complete (314) session initiation using messaging defined in the ISAKMP-based protocol.

However, devices implementing the key identifier encoding in accordance to the present teachings may operate in a system where some devices do not recognize the encoding. Therefore, a fallback mode of operation for a device responding to an exchange request is also defined for cases where an IKE or other ISAKMP-based message exchange is used to establish a secure tunnel such as an IPSec tunnel. Accordingly, at 306, when the responding device is unable to find a shared key with the embedded identifier, it can fall back to using a default key and attempt to process the request message using this key.

Thus, if the key retrieval failed because the initiating device does not support encoding the key identifier into the SPI of the request message but, however, is provisioned (316) with the same default key, then the message exchange and corresponding security session establishment, can still proceed (312) to completion, at 314. But, if the key retrieval failed because the default key was not provisioned (316) into the responding device, session negotiation stops at 308. Likewise, if the default key material does not match the key being used by the initiating device, the message exchange still fails (308) since a matching key is required for the security processing of the message to complete successfully.

In the unlikely case where an initiating device not supporting the encoding of the SPI with the key identifiers randomly chooses a value for the Cookie/SPI that matches the ID of a key the responder possesses, the exchange may fail since the initiating device and responding device will be using different keys. However, the initiating device may again attempt to initiate the exchange using a different randomly generated Cookie/SPI that is also unlikely to match the second time.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for secure packet transmission described herein. The non-processor circuits may include, but are not limited to, a radio receiver, a radio transmitter, signal drivers, clock circuits, power source circuits, and user input devices. As such, these functions may be interpreted as steps of a method for key identification using an ISAKMP-based protocol described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method for key identification using an ISAKMP-based protocol as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for key identification using an Internet Security Association and Key Management Protocol (ISAKMP)-based protocol, the method comprising:
   an initiating device performing:
   generating a message using the ISAKMP-based protocol that includes a security parameter index (SPI) field;
   identifying a key in the SPI field of the message;
   sending the message to a responding device;
   wherein the message comprises a Session Initiation Request.

2. The method of claim 1, wherein the key is a shared key between the initiating and responding devices for establishing a secure tunnel using the ISAKMP-based protocol.

3. The method of claim 1, wherein the ISAKMP-based protocol comprises an Internet Key Exchange (IKE) protocol.

4. The method of claim 3, wherein the IKE protocol comprises IKEv1 or IKEv2.

5. The method of claim 1, wherein the ISAKMP-based protocol comprises an Association of Public Safety Communications Officials International Project 25 Packet Data Security Protocol.

6. The method of claim 1, wherein the SPI field comprises the first eight bytes of the message.

7. A method for key identification using an Internet Security Association and Key Management Protocol (ISAKMP)-based protocol, the method comprising:

a responding device performing:

receiving a message from an initiating device that includes a key identifier that identifies a key;

extracting the key identifier, and attempting to select a shared key using the key identifier, wherein the shared key is for establishing a security session between the initiating and responding devices using the ISAKMP-based protocol;

when the message includes an ISAKMP-based header having a security parameter index (SPI) field that includes the key identifier, and the shared key is identified and selected using the key identifier, using the selected shared key to establish the security session with the initiating device;

when the key identifier fails to identify the shared key, using a default key to establish the security session with the initiating device.

8. The method of claim 7, wherein the ISAKMP-based header comprises an Internet Key Exchange (IKE) protocol header.

9. The method of claim 8, wherein the IKE protocol header comprises an IKEv1 header or an IKEv2 header.

10. The method of claim 7, wherein the message comprises a Session Initiation Request.

11. The method of claim 7, wherein the ISAKMP-based header comprises an Association of Public Safety Communications Officials International Project 25 Packet Data Security Protocol header.

12. The method of claim 7, wherein the SPI field comprises the first eight bytes of the message.

13. A method for key identification using an Internet Security Association and Key Management Protocol (ISAKMP)-based protocol, the method comprising:

a responding device performing:

receiving a message from an initiating device that includes a key identifier that identifies a key;

extracting the key identifier, and attempting to select a shared key using the key identifier, wherein the shared key is for establishing a security session between the initiating and responding devices using the ISAKMP-based protocol;

when the message includes an ISAKMP-based header having a security parameter index (SPI) field that includes the key identifier, and the shared key is identified and selected using the key identifier, using the selected shared key to establish the security session with the initiating device;

wherein the message comprises a Session Initiation Request.

* * * * *